US012585872B2

(12) United States Patent
Doshi et al.

(10) Patent No.: US 12,585,872 B2
(45) Date of Patent: Mar. 24, 2026

(54) HIERARCHICAL AND EXTENSIBLE LANGUAGE MODEL INFERENCE

(71) Applicant: INTUIT INC., Mountain View, CA (US)

(72) Inventors: Jineet Hiren Doshi, Mountain View, CA (US); Maya Vered Livshits, Mountain View, CA (US); Pragya Tripathi, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 249 days.

(21) Appl. No.: 18/393,627

(22) Filed: Dec. 21, 2023

(65) Prior Publication Data

US 2025/0209265 A1     Jun. 26, 2025

(51) Int. Cl.
| | |
|---|---|
| *G06F 40/242* | (2020.01) |
| *G06F 16/334* | (2025.01) |
| *G06F 40/20* | (2020.01) |
| *G06F 40/30* | (2020.01) |

(52) U.S. Cl.
CPC ........ *G06F 40/242* (2020.01); *G06F 16/3344* (2019.01); *G06F 40/20* (2020.01); *G06F 40/30* (2020.01)

(58) Field of Classification Search
CPC .... G06F 40/242; G06F 40/20; G06F 16/3344; G06F 40/30
See application file for complete search history.

(56) References Cited

U.S. PATENT DOCUMENTS

| | | | | |
|---|---|---|---|---|
| 9,740,685 | B2 * | 8/2017 | Beaurpere | G06F 40/242 |
| 11,880,659 | B2 * | 1/2024 | Pentyala | G06N 20/00 |
| 2022/0301670 | A1 * | 9/2022 | Sharma | G06F 40/20 |
| 2022/0318485 | A1 * | 10/2022 | Narayanan | G06F 40/205 |
| 2023/0385541 | A1 * | 11/2023 | Ben Shahar | G06F 40/20 |
| 2025/0209265 | A1 * | 6/2025 | Doshi | G06F 40/242 |

* cited by examiner

*Primary Examiner* — Samuel G Neway
(74) *Attorney, Agent, or Firm* — DLA PIPER LLP US

(57) ABSTRACT

At least one processor can receive an indication of processing to be performed in a natural language processing (NLP) machine learning (ML) pipeline, determine a first model class and a second model class for the processing. The first model class can be at a first hierarchical level of an ML hierarchy schema, and the second model class can be at a second hierarchical level of the ML hierarchy schema. The at least one processor can prepare a dictionary in a memory in communication with the at least one processor, which can comprise populating the dictionary with all required artifacts of the first model class and a subset of required artifacts of the second model class, wherein the second model class requires at least one of the required artifacts of the first model class. The at least one processor can perform NLP on text using the ML model and the dictionary.

20 Claims, 5 Drawing Sheets

302 – receive inference information

304 – identify model class(es)

306 – load base class artifacts

308 – load remaining artifacts

310 – configure parameters/settings

312 – perform inference processing

352 – define/modify model

354 – determine parent class artifacts

356 – assign remaining artifacts to model

400

402

Processor(s)

404

Input Device(s)

412

Network Interface(s)

408

Display

406

Operating System          414

Network Communication     416

ML Pipeline 100 Component(s)  418

Application(s)             420

410

HIERARCHICAL AND EXTENSIBLE LANGUAGE MODEL INFERENCE

BACKGROUND

Natural language processing (NLP) is a field of computing that allows computers and/or other devices to recognize, process, and/or generate natural text resembling human speech and/or writing. NLP can employ rules-based and/or machine learning (ML) algorithms to process text inputs and produce text and/or analytic outputs. Tasks performed by NLP can include, but are not limited to, optical character recognition (OCR), speech recognition, speech segmentation, text-to-speech, word segmentation, tokenization, morphological analysis, syntactic analysis, semantics processing (e.g., lexical semantics processing, relational semantics processing, etc.), text summarization, error (e.g., grammatical error) correction, machine translation, natural language understanding, natural language generation, conversation (e.g., chat bot processing), etc.

Generally, NLP processing is provided by pipelines or other computing environments that are set up and operated by skilled users. Such pipelines can include several operations performed in sequence to deliver a desired output, such as preprocessing and/or inference operations, for example.

Inference can include execution and/or application of one or more NLP models (e.g., ML models) to text in order to process the text. Generally, development and deployment of batch NLP/language models takes weeks worth of effort and requires special NLP and engineering domain knowledge. Also, there are a wide variety of language models, from unsupervised topic models to recurrent neural networks and transformer based generative models. The list of models available is constantly growing due to NLP being a dynamic field. All this makes it challenging to design a generic NLP system that works for every language model, thus facilitating code reuse. The development process can be slow and inefficient because developers must manually create and maintain models. This can lead to a lack of consistency in the models as well as difficulty in tracking changes and ensuring that all models are up to date. It can be difficult to quickly expand an NLP model suite to include new model types or capabilities. NLP pipelines lack scalability or flexibility and exhibit difficulty in maintaining a model suite over time.

BRIEF DESCRIPTIONS OF THE DRAWINGS

DETAILED DESCRIPTION OF SEVERAL EMBODIMENTS

Systems and methods described herein can provide a hierarchical and extensible language model inference arrangement wherein NLP ML model artifacts are loaded and used according to a hierarchical schema. The disclosed schema can organize ML models according to base class, model family, and/or specific model in a hierarchical fashion. Using the schema, the described systems and methods can more efficiently store and load required artifacts and/or other data for executing ML models. Moreover, the schema may be extensible in that adding or changing models at given locations within the schema may result in automatic provisioning of all artifacts and/or other data relevant to the given locations within the schema.

Figure 1:
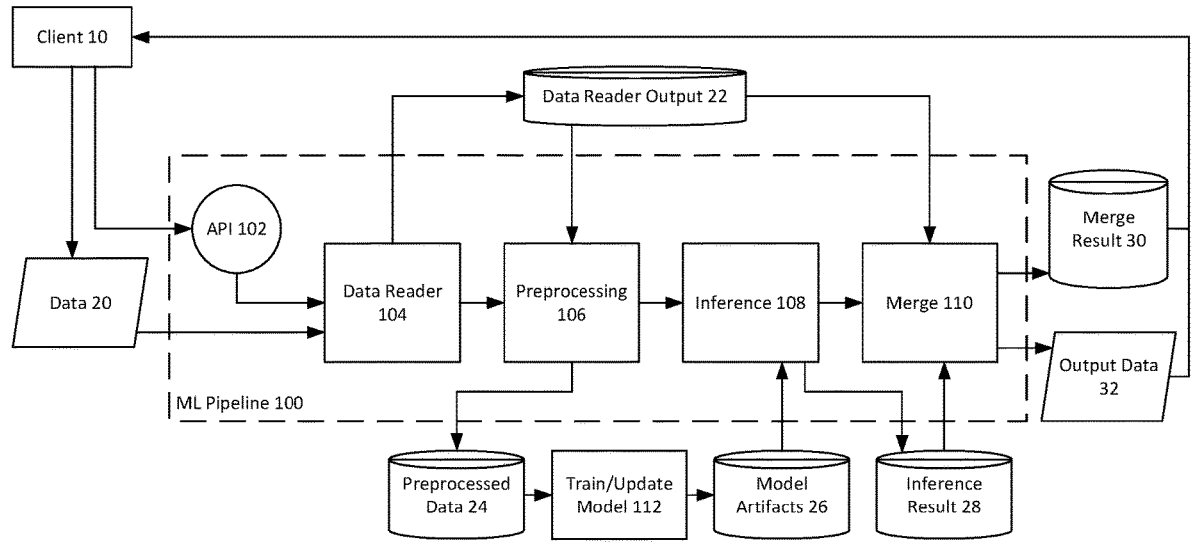
FIG. 1 shows an example machine learning pipeline according to some embodiments of the disclosure.

FIG. 1 shows an example ML pipeline 100 according to some embodiments of the disclosure. ML pipeline 100 can be used to train and/or deploy various NLP models over multiple sources of text at scale, while allowing users to reuse code and capabilities from other NLP processing projects, for example.

ML pipeline 100 may be provided by and/or include a variety of hardware, firmware, and/or software components that interact with one another. For example, ML pipeline 100 may include a plurality of processing modules, such as data reader 104, preprocessing 106, inference 108, and merge 110 modules. As described in detail below, these modules can perform processing to select, configure, and execute one or more NLP models to complete NLP tasks. Some embodiments may include a train/update model 112 module which may operate outside of the main ML pipeline 100 to train and/or update any ML model(s) used by ML pipeline 100, including NLP model(s). As described in detail below, ML pipeline 100 may access one or more memories or data stores for reading and/or writing, such as data reader output 22, preprocessed data 24, model artifacts 26, inference result 28, and/or merge result 30. An API 102 may provide access to and/or interaction with ML pipeline 100, for example by one or more client 10 devices. Client 10 can provide and/or indicate data 20 to be processed by ML pipeline 100, and/or one or more instructions for ML pipeline 100 processing. ML pipeline 100 may process data 20 to produce output data 32, which may be provided to client 10, for example.

Some components within system 100 may communicate with one another using networks. Some components may communicate with client(s), such as client 10, through one or more networks (e.g., the Internet, an intranet, and/or one or more networks that provide a cloud environment). For example, as described in detail below, client 10 can request data and/or processing from ML pipeline 100, and ML pipeline 100 can provide results to client 10. Each component may be implemented by one or more computers (e.g., as described below with respect to FIG. 4).

Elements illustrated in FIG. 1 (e.g., ML pipeline 100 including data reader 104, preprocessing 106, inference 108, and merge 110 modules, train/update 112 module, data stores 22-30, API 102, and/or client 10) are each depicted as single blocks for ease of illustration, but those of ordinary skill in the art will appreciate that these may be embodied in different forms for different implementations. For example, while ML pipeline 100 and the various modules and data stores are depicted separately, any combination of these elements may be part of a combined hardware, firmware, and/or software element. Likewise, while ML pipeline 100 and its components are depicted as parts of a single system, any combination of these elements may be distributed among multiple logical and/or physical locations. Also, while one of each element (e.g., ML pipeline 100 including data reader 104, preprocessing 106, inference 108, and merge 110 modules, train/update 112 module, data stores 22-30, API 102, and/or client 10) are illustrated, this is for clarity only, and multiples of any of the above elements may be present. In practice, there may be single instances or multiples of any of the illustrated elements, and/or these elements may be combined or co-located.

The system of FIG. 1 can perform any number of processes wherein NLP processing is applied to input data to produce a desired result. Within ML pipeline 100, the various modules can perform subsets of such processing that can have unique and/or advantageous features. For example, ML pipeline 100 can include hierarchical and extensible NLP model provisioning wherein models can be configured using a hierarchical schema to more efficiently load and store model artifacts, and models can be added or changed without requiring complete model artifact definitions. This is described in detail below with respect to FIGS. 2-3B The following is a description of the overall operation of ML pipeline 100 providing context for understanding the disclosed embodiments.

Client 10 can provide a UI through which a user can enter commands and/or otherwise interact with ML pipeline 100. For example, client 10 can communicate with ML pipeline 100 over a network such as the internet using API 102. API 102 can be an API known to those of ordinary skill in the art and configured for ML pipeline 100 or a novel API developed specifically for ML pipeline 100. In any event, client 10 can provide instructions for processing by ML pipeline 100 and can send data 20 to be processed to ML pipeline 100 and/or indicate a set of data 20 to be processed so that ML pipeline 100 can retrieve and/or access the data 20.

Data reader 104 can obtain and read data 20. Data reader 104 can be configured to ingest data of multiple types (e.g., sql, csv, parquet, json, etc.). Data reader 104 can be configured to perform some level of preprocessing on data 20 in some embodiments, for example filtering out nulls in the data, deduplicating data, etc. Data reader output 22 may be stored in a memory for subsequent processing.

Preprocessing 106 can process data reader output 22. For example, preprocessing 106 can perform plug and play preprocessing, whereby preprocessing options are selected according to user selections received from client 10. In some embodiments, the "plug and play" aspect of the preprocessing can be realized by enabling user selection of a variety of preprocessing options without requiring programming of such options by the user. In some embodiments, a user can add preprocessing commands to, or remove preprocessing commands from, a config file, for example. A UI of client 10 can present the config file for editing and/or present a GUI component for selecting config file edits. In any case, preprocessing 106 can read the config file and determine appropriate processing command(s) based on the content of the config file and the specific NLP model(s) being used in ML pipeline 100, without further input from the user. Preprocessing 106 can produce a set of preprocessed data 24.

Preprocessed data 24 can be used within the ML pipeline 100 processing and/or to train and/or update one or more ML models. When preprocessed data 24 is being used for training and/or updating, preprocessed data 24 can be applied as input to train/update an ML model 112. The ML model being trained and/or updated can process the preprocessed data 24 according to its algorithm, whether off-the-shelf, known and modified, or custom. Once trained and/or updated, the ML model incorporates the preprocessed data 24 in future processing through the production of model artifacts 26 which can be used in ML pipeline 100 processing, for example during inference 108 processing to perform NLP tasks.

Within ML pipeline 100 processing, inference 108 processing can use preprocessed data 24 and model artifacts 26 to perform NLP tasks as requested by client 10. Inference 108 can select one or more NLP models and apply preprocessed data 24 as input(s) to the selected model(s), thereby producing an inference result 28. In some embodiments, model selection can employ adaptable, reusable hierarchical model inference techniques that can allow users to specify model(s) without supplying code and/or can allow model(s) to reuse configuration and code components as applicable. ML pipeline 100 can be ML framework agnostic so that any models (e.g., sentiment, unsupervised, transformer-based models, etc.) may be selected by the config file and used for inference 108 processing, Inference 108 components and operations are described in greater detail below with reference to FIGS. 2-3B.

Depending on the nature of the NLP processing being performed, merge 110 processing can merge data from data reader output 22 and inference result 28 to form a merge result 30 and/or output data 32, which may be provided to client 10 and/or used for other processing.

Figure 2:
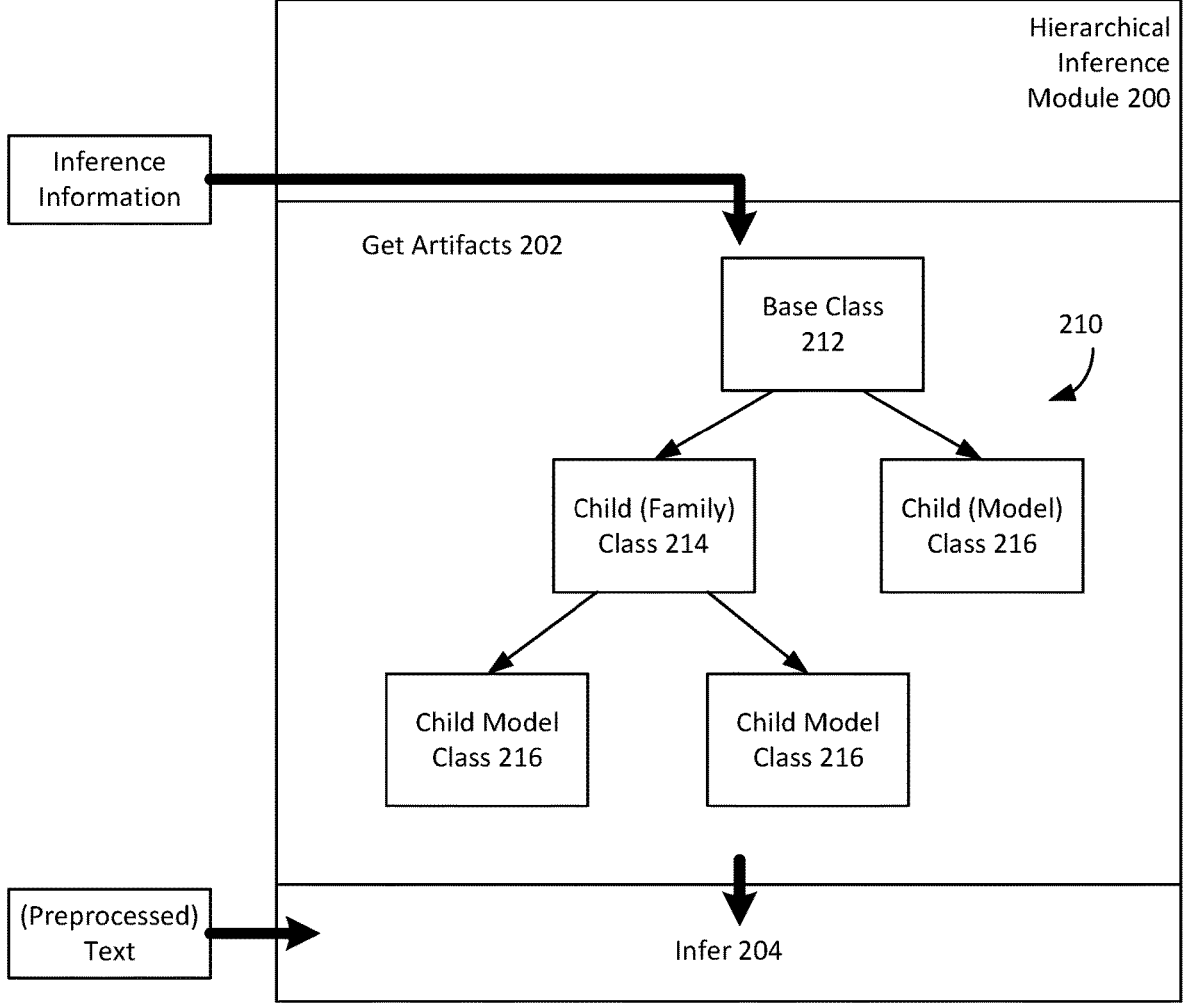
FIG. 2 shows an example hierarchical inference module according to some embodiments of the disclosure.

FIG. 2 is an example hierarchical inference module 200 according to an embodiment of the disclosure. Hierarchical inference module 200 can function as inference 108 module in at least some embodiments of ML pipelines 100. Hierarchical inference module 200 is a central component of the modular, scalable, and reusable ML pipeline 100 that can train and deploy any batch NLP model using declarative inputs. This allows someone without domain knowledge to develop and deploy batch NLP/language models without special NLP and engineering domain knowledge and without the weeks' worth of effort that would be required even of an expert.

For example, hierarchical inference module 200 may be configured to load any batch NLP model along with associated artifacts and provide model scores on any piece of text. Given the constantly evolving, vast variety of language models available (e.g., unsupervised topic models, sentiment models, summarization models, custom text classification models, LSTMs, transformer based models, etc.), hierarchical inference module 200 may be configured to work with any and/or all models.

As described in detail below, hierarchical inference module 200 can operate using a class hierarchy based design that distills core functionality for any language model inference into an interface in a base class. Implementation details for the interface specific to a model or family of models can be added via classes or a hierarchy of classes which extend the base class. This design makes hierarchical inference module 200 flexible enough to be able to support any current or future language models as well as be highly reusable. In an operation example, a user can input the name of the class of the model they would like to use for inference via a configuration file, abstracting away details and complexities of the models and allowing the user to leverage the pipeline without domain knowledge.

Hierarchical inference module 200 can distill core functionality for any language model inference into an interface including two functions: "get artifacts" and "infer." The get artifacts function 202 may load a model 210 and associated artifacts from a path provided to a model class and return the artifacts in a dictionary. The infer function 204 may take in the dictionary having the model and associated artifacts as well as the input text, run the text through the artifacts and the model, and output model scores. The interface may be defined and documented in a base class.

As described in detail below, get artifacts function 202 can receive inference information identifying one or more NLP models to be used for ML pipeline 100 processing and, in some embodiments, at least a portion of NLP parameters or settings. Get artifacts function 202 can fill in implementation details for a given model and/or model class using classes that extend the base class and inherit the interface. An example hierarchical model schema 210 is shown in FIG. 2. The inference information can identify a specific NLP model to be used (e.g., a transformer model configured to perform sentiment analysis, such as BERT or the like). Get artifacts function 202 can identify a base class 212 relevant to the requested NLP model (e.g., from among a plurality of base classes 212). Base class 212 may have one or more child classes beneath it in the hierarchy, and these child classes may in turn optionally have one or more child classes beneath them, and so on in a hierarchical arrangement. A child class may be a model class 216 representing a single model (e.g., unsupervised topic model) or a family class 214 including a plurality of models (e.g., transformer based models). Along with the functions from the base class interface 212, a child class 214, 216 can have more functions or parameters specific to the model or family of models. In case of a family class 214, the class can be extended further to cover a specific model class 216 belonging to the family (e.g., sentiment model can extend transformer model class). Any new model or family of models can be added by extending the appropriate class, whether a base class 212 or a family class 214 representing a family of models lower in the hierarchy.

The ML hierarchy schema 210 can arrange a plurality of ML models hierarchically according to model class, such that a base level for a model class defines all artifacts common to the model class, and at least one level below the base level for the model class defines artifacts specific to a particular ML model of the model class. This design makes hierarchical inference module 200 flexible enough to be able to support any current or future language models and makes hierarchical inference module 200 highly reusable. As described in detail below, for usage, a user may simply enter the name of the class of the model they want to run inference on and the path having the model and associated artifacts via a configuration file. Hierarchical inference module 200 can include code (e.g., infer function 204) that passes the path to the model class and executes that class, thus running the core inference functions along with model specific logic producing model scores for the input text.

Figure 3A:
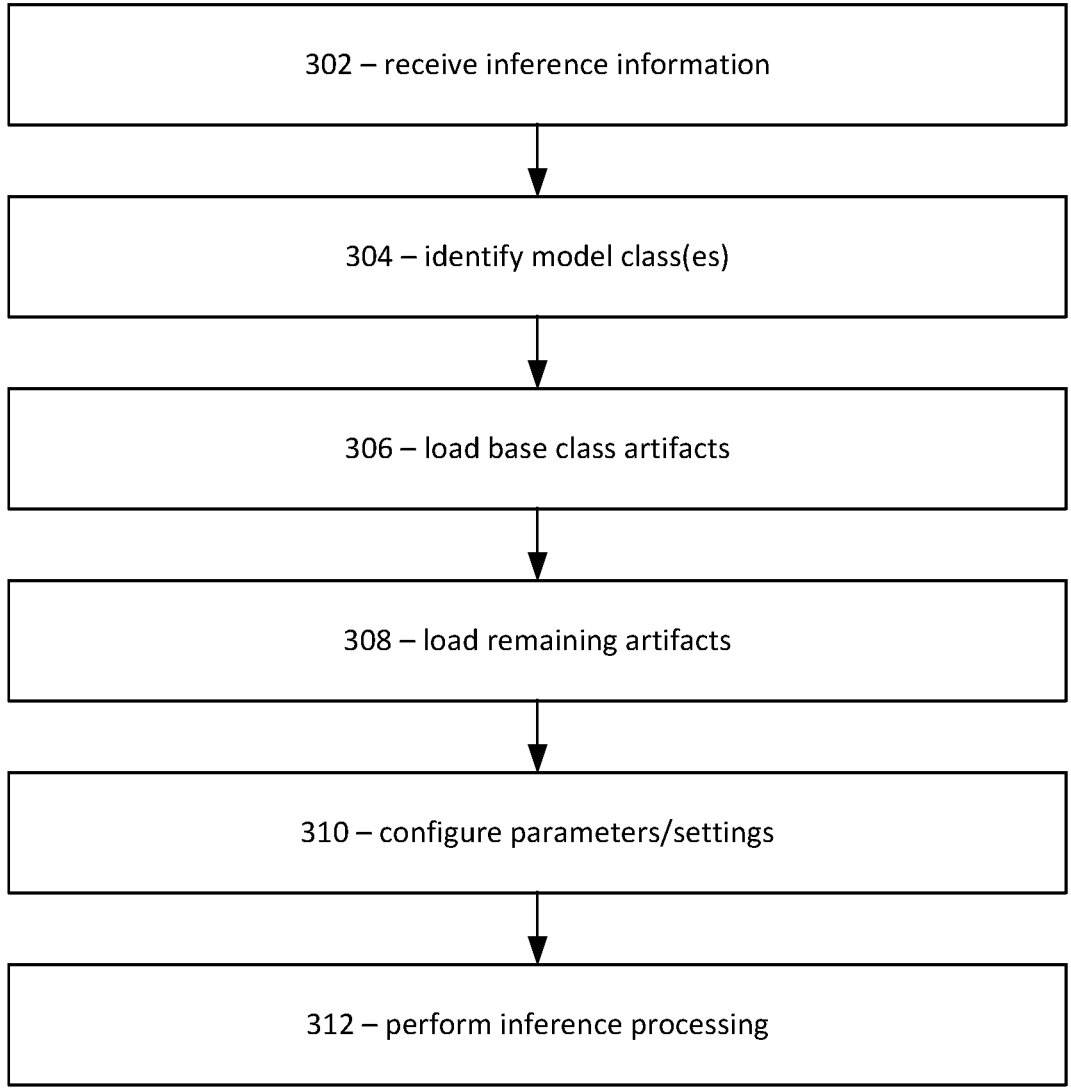
FIG. 3A shows an example hierarchical inference process according to some embodiments of the disclosure.

FIG. 3 is an example hierarchical inference process 300 according to an embodiment of the disclosure. Hierarchical inference module 200 can perform process 300 to configure ML pipeline 100 to perform NLP on text data 20 and/or perform at least a portion of such NLP, for example by getting artifacts used by NLP models and performing inference processing.

At 302, hierarchical inference module 200 can receive inference information. The inference information can include an indication of NLP to be performed in ML pipeline 100. Inference information can be in any format, but in at least some embodiments, inference information can be included in a plain language configuration file processed by preprocessing 106. In these embodiments, inference 108 can interpret the configuration file and send the inference information to hierarchical inference module 200. For example, a configuration file can include information such as the following:

"inference":
{
    "model_class": "SentimentTransformersModelInference",
    "threshold": 0.86
}

Inference 108 can use a dictionary defining "inference" or some other text as an indicator of inference instruction information. The inference instruction information can identify NLP model(s) or model class(es) to be used in inference 108 processing (e.g., transformer) and, if applicable, NLP parameters or settings thereof (e.g., threshold for 0 or 1 labeling in transformer).

At 304, hierarchical inference module 200 can identify one or more model classes that can be used to perform NLP indicated by inference information received at 302. For example, hierarchical inference module 200 can determine a first model class encompassing a first portion of the processing, wherein the first model class is at a first hierarchical level of an ML hierarchy schema 210. The first model class can be a base class 212, for example.

If the base class 212 is sufficient to define all artifacts needed for the NLP, process 300 may continue. However, in many cases, the requested NLP may indicate a specific model or models to use and/or may define the specific type of NLP to be performed in sufficient detail to require a particular model or models. Accordingly, hierarchical inference module 200 can determine a second model class encompassing the second portion of the processing, wherein the second model class is at a second hierarchical level of the ML hierarchy schema 210 beneath the first level. This second level can represent a family class 214 or a model class 216, depending on the specific content of the inference information. If it is a family class 214, hierarchical inference module 200 can identify still further hierarchical levels until the model class 216 is reached. Model class 216 can indicate an ML model to be used in the NLP ML pipeline 100. The ML hierarchy schema 210 may be stored in a memory accessible to hierarchical inference module 200, and determining the first model class and determining the second model class each respectively may include referencing the ML hierarchy schema 210 stored in the memory to identify class definitions indicating the required artifacts for the respective classes.

At 306, hierarchical inference module 200 can load artifacts for base class 212 identified at 304. For example, hierarchical interface module 200 can prepare a dictionary in a memory, which can include populating the dictionary with all required artifacts of base class 212 according to a definition of base class 212 in the hierarchy schema 210. The first model class (e.g., base class 212) can define required artifacts common to a ML model category, which can include or indicate instructions for preparing ML pipeline 100 and performing NLP therewith that are common to the ML model category.

In this context, in some embodiments the artifacts loaded for base class 212 may include more than a model object and other associated objects such as a model dictionary and/or embeddings. For example, hierarchical inference module 200 can also load model properties (e.g., paths, thresholds, etc.) and model functions (e.g., get_topic, tokenize, etc.) that are common to base class 212.

At 308, hierarchical inference module 200 can load remaining artifacts. This can include loading artifacts for any hierarchically lower classes (e.g., family class 214 and/or model class 216) identified at 304. These hierarchically lower classes require at least one of the required artifacts of the first model class (e.g., base class 212) because they are beneath the first model class in hierarchy schema 210. Accordingly, hierarchical inference module 200 need only populate a subset of required artifacts of the second model class into the dictionary, because the portion of required artifacts common to its hierarchical level has already been populated into the dictionary at 306. The second model class may define required artifacts specific to a deployable ML model (e.g., specific to the family class 214 and/or model class 216) identified at 304, and only these specific artifacts are missing from the dictionary after processing at 306. In this way, hierarchy schema 210 simplifies and streamlines defining, storing, and loading artifacts responsive to an NLP request.

In this context, in some embodiments the artifacts loaded for the hierarchically lower classes may include more than a model object and other associated objects such as a model dictionary and/or embeddings. For example, hierarchical inference module 200 can also load model properties (e.g., paths, thresholds, etc.) and model functions (e.g., get_topic, tokenize, etc.) that are specific to family class 214 and/or model class 216 identified at 304.

At 310, hierarchical inference module 200 can configure any parameters and/or settings not covered by the artifacts. For example, the configuration file or other inference information may include specific settings for the NLP to be performed (e.g., threshold settings and/or other tunable parameters), as shown in the example configuration file snippet above. Hierarchical inference module 200 can configure these settings if applicable.

At 312, ML pipeline 100 can perform NLP processing as configured. Returning to FIG. 1, data reader 104 can first obtain data 20 to be processed. Next, preprocessing 106 can perform any requested preprocessing in a requested order. Once preprocessed data 24 is available, inference 108 can run the preprocessed data 24 through the one or more NLP model(s) specified and provisioned as described above. Specifically, infer function 204 can perform NLP on text data using the dictionary prepared by get artifacts function 202 at 302-310 and the ML model specified and provisioned thereby. Merge 110 module can merge data reader output 22 and inference result 28 to produce merge result 30, and/or provide output data 32, according to any requested parameters. Client 10 may access merge result 30 and/or output data 32, thereby obtaining results responsive to an NLP request supplied by a user of client 10.

Figure 3B:
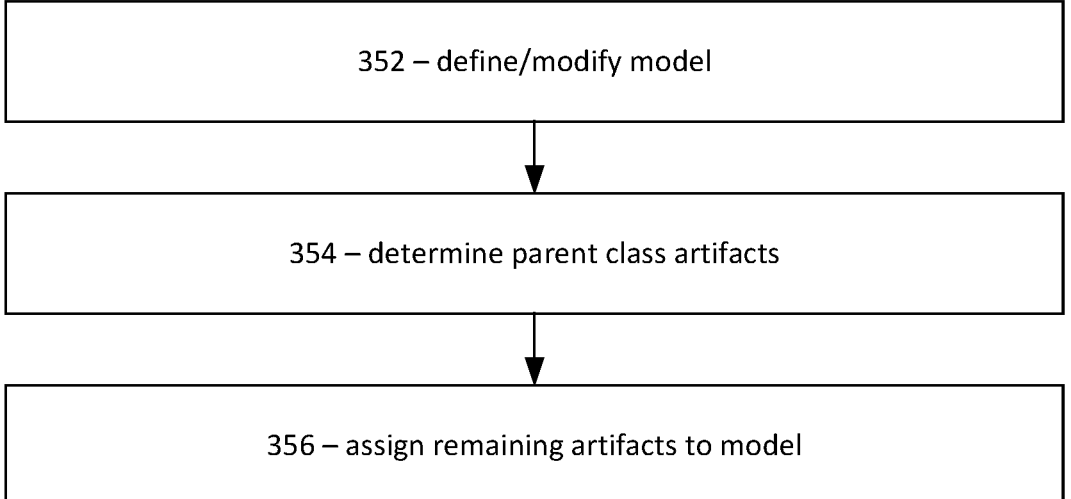
FIG. 3B shows an example hierarchy modification process according to some embodiments of the disclosure.

FIG. 3B shows an example hierarchy modification process 350 according to some embodiments of the disclosure. As noted above, hierarchy schema 210 can streamline and simplify the process of integrating new models into ML pipeline 100 and/or making modifications to existing models. The following example hierarchy modification process 350 takes advantage of the flexibility of hierarchy schema 210.

At 352, hierarchical inference module 200 can define a new model and/or modify an existing model. As discussed above, hierarchy schema 210 can arrange a plurality of ML models hierarchically according to model class, such that a base class 212 level for a class defines all artifacts common to the class, and at least one level below the base level for the model class (e.g., family class 214 and/or model class 216) defines artifacts specific to a particular ML model of the class. A user or automated process can create a new model and insert it into hierarchy schema 210 (e.g., as a new model class 216 below a family class 214 or base class 212) as a child hierarchical level.

At 354, hierarchical inference module 200 can determine a set of required artifacts for the new and/or modified class that are present in one or more parent classes. This can be done simply by automatically assigning artifacts of any parent classes as required artifacts due to their position in hierarchy schema 210 above the model being added or modified. In other words, hierarchical interface module 210 may identify at least one parent hierarchical level of hierarchy schema 210, where the parent hierarchical level representing a parent class including a parent set of required artifacts consisting of at least one, and fewer than all, of the required artifacts. For example, hierarchical inference module 200 can determine the parent hierarchical level by referencing hierarchy schema 210 stored in a memory accessible to ML pipeline 100 (e.g., model artifacts 16 in FIG. 1) to identify the required artifacts.

At 356, hierarchical inference module 200 can assign any remaining required artifacts to the new and/or modified class. In other words, all required artifacts excluded from the parent set of required artifacts may be assigned as a child set of required artifacts. The parent model class(es) may define required artifacts common to an ML model category, and the child model class may define required artifacts specific to a deployable ML model.

In some embodiments, hierarchical inference module 200 can receive definitions of artifacts for inclusion in the new and/or modified model from user input. In some embodiments, hierarchical inference module 200 can discover the artifacts for inclusion in the new and/or modified model. For example, FIG. 1 shows train/update model 112 module in communication with and/or included within ML pipeline 100. Train/update model 112 module can train the ML model defined in the new and/or modified class using training data and/or live data according to the training procedures of the model in question as understood by those of ordinary skill in the art. As a result, one or more artifacts may be generated from the training. Train/update model 112 module can perform training multiple times in some cases to ensure a full set of artifacts is generated. At this point, any artifacts generated in training that are not in the parent set of required artifacts may be assigned to the new and/or modified model.

Hierarchical inference module 200 can store updates to hierarchy schema 10 in a memory accessible to ML pipeline 100, which may include adding the child set of required artifacts to hierarchy schema 210 stored in the memory (e.g., as model artifacts 16 in FIG. 1).

Figure 4:
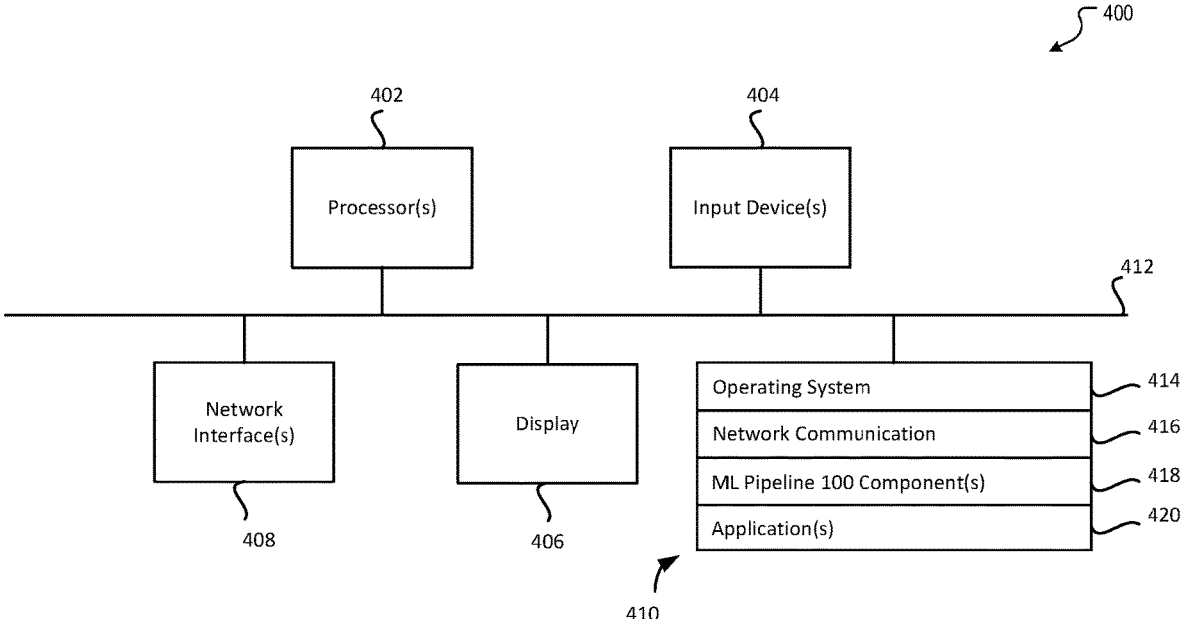
FIG. 4 shows a computing device according to some embodiments of the disclosure.

FIG. 4 shows a computing device 400 according to some embodiments of the disclosure. For example, computing device 400 may function as ML pipeline 100 or any portion(s) thereof, or multiple computing devices 400 may function as ML pipeline 100 or any portion(s) thereof.

Computing device 400 may be implemented on any electronic device that runs software applications derived from compiled instructions, including without limitation personal computers, servers, smart phones, media players, electronic tablets, game consoles, email devices, etc. In some implementations, computing device 400 may include one or more processors 402, one or more input devices 404, one or more display devices 406, one or more network interfaces 408, and one or more computer-readable mediums 410. Each of these components may be coupled by bus 412, and in some embodiments, these components may be distributed among multiple physical locations and coupled by a network.

Display device 406 may be any known display technology, including but not limited to display devices using Liquid Crystal Display (LCD) or Light Emitting Diode (LED) technology. Processor(s) 402 may use any known processor technology, including but not limited to graphics processors and multi-core processors. Input device 404 may be any known input device technology, including but not limited to a keyboard (including a virtual keyboard), mouse, track ball, and touch-sensitive pad or display. Bus 412 may be any known internal or external bus technology, including but not limited to ISA, EISA, PCI, PCI Express, NuBus, USB, Serial ATA or FireWire. In some embodiments, some or all devices shown as coupled by bus 412 may not be coupled to one another by a physical bus, but by a network connection, for example. Computer-readable medium 410 may be any medium that participates in providing instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 410 may include various instructions 414 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 412. Network communications instructions 416 may establish and maintain network connections (e.g., software for implementing communication protocols, such as TCP/IP, HTTP, Ethernet, telephony, etc.).

ML pipeline 100 components 418 may include the system elements and/or the instructions that enable computing device 400 to perform functions of ML pipeline 100 as described above. Application(s) 420 may be an application that uses or implements the outcome of processes described herein and/or other processes. In some embodiments, the various processes may also be implemented in operating system 414.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks;

magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, by at least one processor, an indication of processing to be performed in a natural language processing (NLP) machine learning (ML) pipeline;

determining, by the at least one processor, a first model class encompassing a first portion of the processing, wherein the first model class is at a first hierarchical level of an ML hierarchy schema;

determining, by the at least one processor, a second model class encompassing a second portion of the processing, wherein the second model class is at a second hierarchical level of the ML hierarchy schema beneath the first level and indicates an ML model to be used in the NLP ML pipeline;

preparing, by the at least one processor, a dictionary in a memory in communication with the at least one processor, the preparing comprising populating the dictionary with all required artifacts of the first model class and a subset of required artifacts of the second model class, wherein the second model class requires at least one of the required artifacts of the first model class; and performing, by the at least one processor, NLP on a text using the ML model and the dictionary.

2. The method of claim 1, wherein the first model class defines required artifacts common to a ML model category.

3. The method of claim 1, wherein the second model class defines required artifacts specific to a deployable ML model.

4. The method of claim 1, wherein the first model class includes instructions for the preparing and the performing that are executed by the at least one processor.

5. The method of claim 1, wherein the ML hierarchy schema arranges a plurality of ML models hierarchically according to model class, such that a base level for a model class defines all artifacts common to the model class, and at least one level below the base level for the model class defines artifacts specific to a particular ML model of the model class.

6. The method of claim 1, wherein the ML hierarchy schema is stored in the memory, and wherein determining the first model class and determining the second model class each respectively comprise referencing the ML hierarchy schema stored in the memory to identify the required artifacts.

7. The method of claim 6, further comprising modifying, by the at least one processor, the ML hierarchy schema stored in the memory, the modifying comprising:

determining a set of required artifacts used by a new model;

determining a parent hierarchical level for the new model, the parent hierarchical level representing a parent class including a parent set of required artifacts consisting of at least one, and fewer than all, of the required artifacts; and creating a child hierarchical level of the ML hierarchy schema beneath the parent level and assigning the new model to the child hierarchical level, the creating comprising designating all required artifacts excluded from the parent set of required artifacts as a child set of required artifacts.

8. A method comprising:

determining, by at least one processor, a set of required artifacts used by a new model to perform processing in a natural language processing (NLP) machine learning (ML) pipeline;

determining, by the at least one processor, a parent hierarchical level of an ML hierarchy schema, the parent hierarchical level representing a parent class including a parent set of required artifacts consisting of at least one, and fewer than all, of the required artifacts;

creating, by the at least one processor, a child hierarchical level of the ML hierarchy schema beneath the parent level and assigning the new model to the child hierarchical level, the creating comprising designating all required artifacts excluded from the parent set of required artifacts as a child set of required artifacts;

receiving, by at least one processor, an indication of processing to be performed in the NLP ML pipeline by the new model;

preparing, by the at least one processor, a dictionary in a memory in communication with the at least one processor, the preparing comprising populating the dictionary with the parent set of required artifacts and the child set of required artifacts; and performing, by the at least one processor, NLP on a text using the new model and the dictionary.

9. The method of claim 8, wherein the parent model class defines required artifacts common to a ML model category.

10. The method of claim 8, wherein the child model class defines required artifacts specific to a deployable ML model.

11. The method of claim 8, wherein the parent model class includes instructions for the preparing and the performing that are executed by the at least one processor.

12. The method of claim 8, wherein the ML hierarchy schema arranges a plurality of ML models hierarchically according to model class, such that a base level for a model class defines all artifacts common to the model class, and at least one level below the base level for the model class defines artifacts specific to a particular ML model of the model class.

13. The method of claim 8, wherein the ML hierarchy schema is stored in the memory, determining the parent hierarchical level comprises referencing the ML hierarchy schema stored in the memory to identify the required artifacts, and creating the second hierarchical level comprises adding the child set of required artifacts to the ML hierarchy schema stored in the memory.

14. A system comprising:

at least one processor; and at least one non-transitory computer-readable memory storing a machine learning (ML) hierarchy schema and instructions that, when executed by the at least one processor, cause the at least one processor to perform processing comprising:

receiving an indication of processing to be performed in a natural language processing (NLP) ML pipeline;

determining a first model class encompassing a first portion of the processing, wherein the first model class is at a first hierarchical level of the ML hierarchy schema;

determining a second model class encompassing a second portion of the processing, wherein the second model class is at a second hierarchical level of the ML hierarchy schema beneath the first level and indicates an ML model to be used in the NLP ML pipeline;

preparing a dictionary in the memory, the preparing comprising populating the dictionary with all required artifacts of the first model class and a subset of required artifacts of the second model class, wherein the second model class requires at least one of the required artifacts of the first model class; and performing NLP on a text using the ML model and the dictionary.

15. The system of claim 14, wherein the first model class defines required artifacts common to a ML model category.

16. The system of claim 14, wherein the second model class defines required artifacts specific to a deployable ML model.

17. The system of claim 14, wherein the first model class includes instructions for the preparing and the performing that are executed by the at least one processor.

18. The system of claim 14, wherein the ML hierarchy schema arranges a plurality of ML models hierarchically according to model class, such that a base level for a model class defines all artifacts common to the model class, and at least one level below the base level for the model class defines artifacts specific to a particular ML model of the model class.

19. The system of claim 14, wherein determining the first model class and determining the second model class each respectively comprise referencing the ML hierarchy schema stored in the memory to identify the required artifacts.

20. The system of claim 19, wherein the instructions further cause the at least one processor to perform processing comprising modifying the ML hierarchy schema stored in the memory, the modifying comprising:

determining a set of required artifacts used by a new model;

determining a parent hierarchical level for the new model, the parent hierarchical level representing a parent class including a parent set of required artifacts consisting of at least one, and fewer than all, of the required artifacts; and creating a child hierarchical level of the ML hierarchy schema beneath the parent level and assigning the new model to the child hierarchical level, the creating comprising designating all required artifacts excluded from the parent set of required artifacts as a child set of required artifacts.

\* \* \* \* \*